United States Patent [19]

Verity

[11] Patent Number: 4,915,837

[45] Date of Patent: Apr. 10, 1990

[54] HOLLOW FIBER SHEET FILTER OF ALPHA CELLULOSE

[76] Inventor: Denis B. Verity, Cliff Cottage, Coppell Hill, Goodrich, Ross-on-Wye, Herefordshire, England

[21] Appl. No.: 258,679

[22] Filed: Oct. 17, 1988

[30] Foreign Application Priority Data

Jan. 14, 1988 [GB] United Kingdom ............... 8800798

[51] Int. Cl.$^4$ ............................................ B01D 39/18
[52] U.S. Cl. ................................. 210/456; 210/490; 210/494.1; 210/500.29
[58] Field of Search .............. 210/238, 321.88, 418, 210/456, 460, 502.1, 500.23, 500.29, 503, 655, 909, 928, 321.74, 321.83, 490, 494.1; 55/16; 208/180; 527/313

[56] References Cited

U.S. PATENT DOCUMENTS

| 4,323,627 | 4/1982 | Joh ................................. 210/500.29 |
| 4,369,110 | 1/1983 | Picek .................................... 210/238 |
| 4,454,259 | 6/1984 | Reischl et al. ....................... 210/928 |
| 4,632,756 | 12/1986 | Coplan et al. ................... 210/321.88 |
| 4,655,939 | 4/1987 | Moser .................................. 210/503 |
| 4,663,163 | 5/1987 | Hou et al. ......................... 210/502.1 |
| 4,713,292 | 12/1987 | Takemura et al. ............. 210/500.29 |
| 4,781,834 | 11/1988 | Sekino et al. ................... 210/321.88 |

FOREIGN PATENT DOCUMENTS

| 0020046 | 5/1981 | Japan ................................. 210/500.23 |
| 572256 | 9/1945 | United Kingdom ............... 210/500.25 |
| 682400 | 11/1952 | United Kingdom ............. 210/500.29 |
| 752827 | 7/1956 | United Kingdom .................. 210/506 |
| 1301822 | 1/1973 | United Kingdom .................. 210/506 |
| 2018149 | 10/1979 | United Kingdom .................. 210/505 |
| 2031296 | 4/1980 | United Kingdom ............. 210/500.29 |
| 2034192 | 6/1980 | United Kingdom .................. 210/490 |
| 2119272 | 11/1983 | United Kingdom ............. 210/321.88 |

OTHER PUBLICATIONS

International Patent WO 8300098, Lee et al, Baxter Travenol Laboratories, "Microporous Hollow Fiber Membrane Assembly and Its Method of Manufacture", 1–1983.

*Primary Examiner*—Richard V. Fisher
*Assistant Examiner*—Joseph Drodge
*Attorney, Agent, or Firm*—Fleit, Jacobson, Cohn, Price, Holman & Stern

[57] ABSTRACT

Filter apparatus for filtering a liquid, the apparatus comprising a rigid chamber 10 having a liquid inlet 20 and a filtrate outlet 18, a mass 30 of hollow fiber cross-linked matrix of alpha cellulose in the form of cotton staple fibers formed into a sheet which is rolled into a cylinder to form a mass, loosely packed into the chamber when dry. A distributor is connected to the liquid inlet effective to feed a liquid to be filtered over a substantial surface area of one axial end of the cylindrical mass, whereby when the liquid is passed therethrough, the matrix will expand to be tightly packed into the chamber.

9 Claims, 1 Drawing Sheet

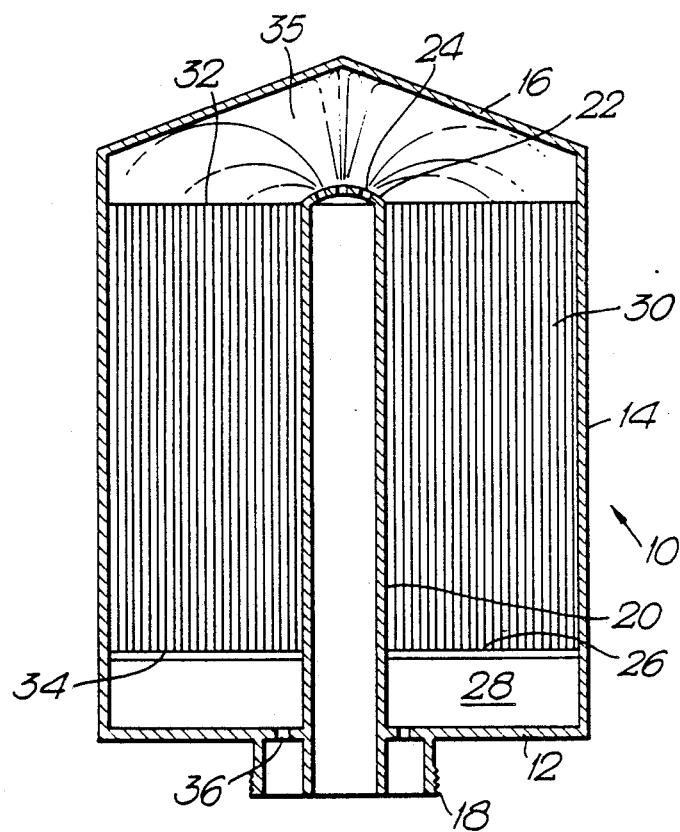

HOLLOW FIBER SHEET FILTER OF ALPHA CELLULOSE

The present invention relates to filter apparatus for filtering a liquid.

A filtering apparatus of this type conventionally is in the form of a rigid chamber having a liquid inlet and a filtrate outlet and a filtering medium is included in the chamber. This medium often is in the form of a metal mesh, for example in oil filters for internal combustion engines and in recent times a paper filter medium has been proposed. The metal mesh medium can only filter out relatively large particle sizes and the paper filter medium tends to clog extensively.

British Patent 2,119,272 discloses a filter for lubricating oil which comprises an axial flow, spirally wound filter element of annular cross-section formed from a microporous sheet of resin bonded cellulosic fibers derived from sulphated wood pulp, preferably a mixture of soft and hard woods with the fibers preferably oriented in one direction and with the sheet having pores of 5 to 100 microns diameter. Such a structure has certain advantages over the conventional oil filter but still does not enable the removal of very small particle sizes.

British Patent 2,031,296 is similar and shows a spirally wound, axial flow paper filter element demountably attached to a cast metal filter head which includes an inlet port and an outlet port and a mounting flange.

British Patent 2,018,149 is concerned with separating out lymphocytes from a suspension and includes a mass of fibers 2 exhibiting an average fiber diameter of greater than 10 microns but not greater than 60. Again, this does not provide entirely satisfactory results.

British Patent 1,301,822 discloses a separator comprising oil and water insoluble porous paper, impregnated both with a cured water in soluble strengthening resin which extends throughout the paper in film form, coating fibers of the paper without substantially altering the porous character of the paper. A fluorochemical is also carried by the fibres of the porous paper, the paper being repellant to oil and sufficiently hydrophillic to be instantaneously wetted by the water.

British Patent 752,827 utilizes a filtering medium of small particles of resin impregnated paper.

British Patent 682,400 discloses a filter medium of the edge filtration type comprising a pile of annulae or strips of paper made substantially of material having hollow fibers and impregnated with the waterproofing medium. The impregnation with the waterproofing material is carried to an extent sufficient to fill only a small proportion of the hollow fibers to render the paper discs or strips resistant to loss of identity when wetted while enabling the remainder of the hollow fibers to absorb their maximum capacity for water and permit only the other liquid, for example oil, to pass the filter.

British Patent 572,256 is concerned with an oil filter in which an inlet pipe is surrounded for almost the whole of its length by a sleeve or tube of paper strip coiled into a tapered spiral and filtering material is arranged in the surrounding container outside the tapered spiral.

U.S. Pat. No. 4,369,110 employs, for use on an internal combustion engine, an oil filter in which the chamber, which is fed via a needle is filled with a packing of discrete fibres.

None of these structures produces an adequate cleaning or filtering out of small particles at a low cost.

It is now proposed, according to the present invention, to provide filter apparatus for filtering a liquid, said apparatus comprising a rigid chamber, a liquid inlet and a filtrate outlet, a mass of hollow fibers formed as a cross-linked matrix of alpha cellulose in the form of cotton staple fibers formed into a sheet which is rolled into a cylinder to form said mass, whereby said mass is loosely packed into said chamber, when dry, and a distributor connected to said liquid inlet effective to feed said liquid to be filtered over a substantial surface area of one axial end of said cylindrical mass, whereby when the liquid is passed therethrough, the matrix will expand to be tightly packed into the chamber.

The construction of the present invention can filter out very small particle sizes indeed and can operate for an extended period without becoming significantly clogged.

It has been found that the use of alpha cellulose as the filtering medium gives these much improved results.

The hollow fibre matrix preferably has a pore size distribution in the range 5 nm to 500 nm (nanometers) and the walls of the matrix have a density of 0.28 to 0.5 grams per cc when loosely packed dry into the chamber.

Although it is contemplated that the fibres can be formed into the matrix in a number of different ways, a preferred method of manufacture is to form the fibres into a sheet on a conventional paper making machine and subsequently rolling this sheet up into a cylinder to form the mass. Advantageously the sheet has a thickness of 0.5 to 2 mm preferably of 1.1 to 1.2 mm.

The filter is capable of removing small quantities of P.C.B.s (small polychlorinated diphenyls) by the mechanism of hydrogen bonding. The less chlorinated P.C.B.'s have a sufficient degree of aromaticity to create hydrogen bonds with the surface of the filter media and therefore will be retained and effectively removed from the fluid. It is these lower chlorinated materials which tend to be those with the highest carcinogenic properties. P.C.B.'s will also be degraded by the usual free radical mechanism which applies in most chemical reactions. In the same way that the filter media quenches free radicals of normal autoxidation it will perform the same function in the free radical degradation of P.C.B.'s and as a result will aid the removal of such materials and intermediaries from the circulating fluids.

In a preferred construction a distributor is associated with the liquid inlet to cause the liquid to be filtered to be distributed over a wide surface area of the mass. This can be achieved, for example, by feeding the liquid to be filtered over a substantial surface area of one axial end of the cylindrical mass. The chamber may be cylindrical and have an inlet feed tube passing axially through the centre of the mass, an inlet gallery being formed between one axial end of the mass and an end wall of the chamber, and the distributor may be arranged to project a plurality of streams of liquid to be filtered against the end wall from which it is deflected to flow back onto the one axial end of the mass.

Other means may be provided for distributing the liquid to be filtered over the axial end. For example the feed may be from said one axial end of the matrix of fibers and a perforated plate may be provided to cover this end of the plate, the perforations thus producing the distribution plate may be provided to produce the distribution.

Advantageously means are provided to support the mass whereby an outlet gallery is formed between the other axial end of the mass and the other end wall of the chamber, the filtrate outlet being connected to the outlet gallery.

One of the advantages of using a matrix formed of loosely packed Alpha cellulose is the high hydrogen bonding ability which enables adsorption to take place with polar material in its natural state. It has been found that when a compacted matrix of Alpha cellulose material is formed under controlled conditions particularly advantageous properties are provided as a filter medium for hydrocarbon fluids. It has been found that this can greatly extend the life of hydrocarbon oils as used in machinery. On fuels such as diesel oils, it has been found that such a filter prevents the precipitation of amorphous waxes by conversion of the amorphous state of these waxes into micro-crystaline forms which prevents blockage of the injectors and connecting lines, etc. This can be found to be achieved even in temperatures as low as $-12°$ C.

It is also contemplated that the reverse ability could be provided by silanising the filtering medium with a silane compound, such as a halogen alkyl silane, or an alkylsilyl ester. This produces a matrix which converts the surface into a non-hydrogen bonding form which thus rejects polar materials and can therefore be successfully used for the fine filtration of water glycol and other fire-resistant fluids.

In its unsilanised state it has been found that the Alpha cellulose again removes very fine particles both metallic and non-metallic, can remove oxidised acid precursor materials, inorganic acids and basic compounds in the presence of water and organic acids.

In order that the present invention may more readily be understood, the following description is given, merely by way of example, reference being made to the accompanying drawing in which the sole FIGURE is a schematic cross-section of one embodiment of apparatus according to the invention.

The apparatus illustrated includes a rigid chamber indicated by the general reference numeral 10 having a circular lower end wall 12, a cylindrical periheral wall 14 and a conical end wall 16. The lower end wall 12 is provided with a conventional threaded spigot 18 for connection to a receptacle for the filtrate from the apparatus. Co-axially mounted within the spigot is a feed tube 20 provided at its upper end with a distributor 22 having a plurality of discharge apertures 24.

A supporting grid indicated by bar 26 is mounted above the lower end wall 12 to define therebelow an outlet chamber 28.

Packed within the chamber 10 is a filtering medium 30. This medium is in the form of a mass of hollow cross-linked matrix Alpha cellulose fibers the walls of which have a pore size distribution in the range 5 nm to 500 nm (nanometers) and a fiber matrix density of 0.28 to 0.5 grams per cc. These fibres are loosely packed into the chamber and this is preferably achieved by forming the fibers, which may be cotton staple fibres, into a sheet on a conventional paper making machine to have a thickness of 0.5 to 2 mm, preferably of 1.1 to 1.2 mm. The sheet is then rolled up into a cylindrical roll and inserted into the chamber 14. In this way an upper surface 32 and a lower surface 34 of the filter mass are provided which are annular in shape. The conical end wall 16, the upper surface 32 and the upper part of the cylindrical wall 14 above surface 32 define an inlet gallery 35.

When the apparatus described is fitted to a source of liquid to be filtered, this liquid passes up through the feed tube 20 and is sprayed outwardly through the apertures 24 against the conical wall 16. It is deflected downwardly by this wall to fall relatively evenly over the upper surface 32 of the mass 30. As the liquid flows down, the fibers of the matrix immediately expand so that they become tightly packed in the chamber 10. It has been found that these can filter out particle sizes as low as 1 micron and that a very small pressure drop indeed is experienced as the liquid flows downwardly. There is a certain measure of passage of the liquid between the convolutions of the cylindrical roll, but the liquid finds its own path through the mass of fibers forming the matrix which gradually expands to provide the necessary homogenious filtering medium. The liquid flows out into the outlet chamber 28 and thence through apertures 34 into the outlet spigot 18.

I claim:

1. Filter apparatus for filtering a liquid, said apparatus comprising a rigid chamber, a liquid inlet and a filtrate outlet, a mass of hollow fibers formed as a cross-linked matrix of alpha cellulose, in the form of cotton staple fibers, formed into a sheet which is rolled into a cylinder to form said mass, whereby said mass is loosely packed into said chamber, when dry, and a distributor connected to said liquid inlet effective to feed said liquid to be filtered over a substantial surface area of one axial end of said cylindrical mass, whereby when the liquid is passed therethrough the matrix will expand to be tightly packed into the chamber.

2. Apparatus as claimed in claim 1, wherein the walls of the hollow fibre matrix have a pore size distribution in the range 5 nm to 500 nm (nanometers).

3. Apparatus as claimed in claim 1, wherein the hollow fibre matrix has a density of 0.28 to 0.5 g per cc when loosely packed into said chamber.

4. Apparatus as claimed in claim 1, wherein said sheet has a thickness of 0.5 to 2 mm.

5. Apparatus as claimed in claim 1, wherein said sheet has a thickness of 1.1 to 1.2 mm.

6. Apparatus as claimed in claim 1, wherein said chamber is cylindrical and further comprises an inlet feed tube passing axially through the centre of said mass, an inlet gallery formed between one axial end of the mass and an end wall of the chamber, and wherein said distributor is arranged to project a plurality of streams of liquid to be filtered against said end wall from which said streams are deflected to flow back onto said one axial end of the mass.

7. Apparatus as claimed in claim 6, and further comprising means to support the mass whereby an outlet gallery is formed between the other axial end of the mass and the other end wall of the chamber, the filter outlet being connected to said outlet gallery.

8. Apparatus as claimed in claim 1, wherein said matrix is silanised.

9. Apparatus as claimed in claim 8, wherein said matrix is silanised by treatment with a halogen alkyl silane or an alkylsilyl ester.

* * * * *